UNITED STATES PATENT OFFICE 2,496,968

ALPHA:BETA:2:2'-TETRAMETHYL-4:4'-DIHYDROXYSTILBENE

Eric Walton and Bertram James Frank Hudson, London, England, assignors to Burroughs Wellcome & Co. (U. S. A.) Incorporated, New York, N. Y., a corporation of New York No Drawing. Application August 17, 1946, Serial No. 691,392. In Great Britain October 5, 1945

1 Claim. (Cl. 260—613)

This invention relates to the synthesis of certain derivatives of stilbene and of certain derivatives of di-benzyl.

The object of the invention is to make possible the production of certain novel compounds having some similarity in structural formulae to 4:4'-dihydroxy-$\alpha$:$\beta$-diethylstilbene, better known as stilboestrol, which compound has therapeutic activity as an oestrogen.

The compounds to which the present invention relates are those having the general formula

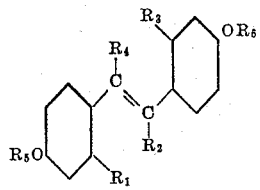

I and the corresponding fully saturated dibenzyl compounds

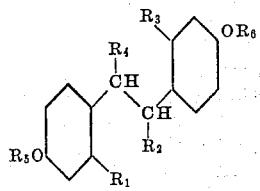

II

In the above general formula $R_1$, $R_2$, $R_3$, $R_4$, $R_5$ and $R_6$ are each hydrogen or an alkyl group, either $R_1$ or $R_3$ always being an alkyl group. Normally the alkyl groups mentioned are methyl or ethyl groups.

In accordance with the present invention compounds of the general formula I above given are made by carrying out a Grignard reaction upon the corresponding desoxybenzoin derivative III

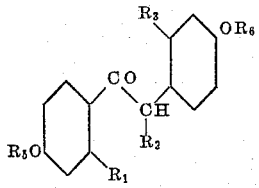

III ($R_5$ and $R_6$ being preferably alkyl groups and at least one of the nuclear substituent groups $R_1$ and $R_3$ being an alkyl group) to form the corresponding tertiary carbinol, followed by a reaction to effect elimination of water, and if, as is normally the case, the dihydroxy rather than the dialkoxy stilbene compound is the desired product, by dealkylation.

The invention also includes the preparation of the corresponding di-benzyl derivatives of general formula II by hydrogenation (preferably catalytic hydrogenation) of the dialkoxystilbene or dihydroxystilbene compounds formed as above described followed, if desired, by dealkylation.

Alternatively, in accordance with a modified process according to the invention the desoxybenzoin derivatives of general formula III may be directly reduced (preferably by heating with amalgamated zinc and acid) to the dibenzyl compounds of the general formula II.

In our preferred compounds the pairs of groups $R_1$ and $R_2$ together and $R_3$ and $R_4$ together each contain two carbon atoms. These preferred compounds, as well as many of the other novel compounds of this invention, have oestrogenic activity.

The invention will be more clearly understood from consideration of the following specific examples, which are given by way of illustration only. Certain of the substances to which the process of the invention is applied being themselves novel compounds, the preparation of these starting materials is also briefly described.

Example 1

Five grammes of 2-methyldesoxyanisoin (III, $R_1=R_5=R_6=Me$, $R_2=R_3=H$) (prepared by the condensation of 4-methoxyphenylacetyl chloride with 3-methylanisole in the presence of aluminum chloride) were heated with 10 g. of amalgamated zinc, concentrated hydrochloric acid (20 c. c.) water (20 c. c.) and glacial acetic acid (20 c. c.) for 20 hours under reflux. The oily product, which solidified on cooling the solution, was filtered, dried and recrystallised from methanol. Alternatively, it could be extracted with ether, and the extract washed with water, dried and evaporated to give the same crude product. Pure 2-methyl-4:4'-dimethoxydibenzyl (II, $R_1=R_5=R_6=Me$, $R_2=R_3=R_4=H$) was obtained as a crystalline solid, melting point 54–5° C.

One and a half grammes of 2-methyl-4:4'-dimethoxydibenzyl were demethylated by heating with glacial acetic acid (9 c. c.) and hydriodic acid of density 1.7 (6 c. c.) for one hour at 140°. The product crystallised in laths from benzene (M. P. 144–5°) and consisted of 2-methyl-4:4'-dihydroxydibenzyl (II, $R_1=Me$, $R_2=R_3=R_4=R_5=R_6=H$).

Example 2

Five grammes of ms:2-dimethyldesoxyanisoin (III, $R_1=R_2=R_5=R_6=Me$, $R_3=H$) (prepared from 2-methyldesoxyanisoin by heating its solution in ethanol with sodium ethoxide and methyl iodide) was treated exactly as in Example 1. The product was isolated either directly or by ether extraction. It crystallised from methanol in prisms, melting point 51–3° and consisted of β:2-dimethyl-4:4'-dimethoxydibenzyl (II, $R_1=R_2=R_5=R_6=Me$, $R_3=R_4=H$).

This substance was demethylated, in exactly the same way as the product in Example 1, to give β:2-dimethyl-4:4'-dihydroxydibenzyl (II, $R_1=R_2=Me$, $R_3=R_4=R_5=R_6=H$) as prisms, melting point 131–3°.

Example 3

Three grammes of 2'-methyldesoxyanisoin (III, $R_3=R_5=R_6=Me$, $R_1=R_2=H$) (prepared by the condensation of 2-methyl-4-methoxyphenylacetyl chloride with anisole in the presence of aluminium chloride) were added to the Grignard reagent prepared from magnesium (0.3 g.) and methyl iodide (3 g.) in dry ether. After standing overnight the mixture was decomposed with ice and dilute hydrochloric acid, and extracted with ether. The extract was washed, dried and evaporated to dryness. The residual yellow oil was heated for one hour at 100° and then crystallised from methanol. Thus, β:2-dimethyl-4:4'-dimethoxystilbene (I, $R_1=R_2=R_5=R_6=Me$, $R_3=R_4=H$) separated in minute elongated prisms, melting point 96–7°.

By hydrogenation of this material (0.8 g.) in acetone solution (12 c. c.) in the presence of palladised charcoal (0.4 g.) at 2 atmospheres pressure there was obtained β:2-dimethyl-4:4'-dimethoxydibenzyl, melting point 51–3°, identical with the material described in Example II.

Example 4

Fourteen and a half grammes of β-ethyl-2-methyldesoxyanisoin (III, $R_1=R_5=R_6=Me$, $R_2=Et$, $R_3=H$) (prepared from 2-methylanisoin by heating its solution in ethanol with sodium ethoxide and ehyl iodide) dissolved in 20 c. c. of dry ether was added to the Grignard reagent prepared from magnesium (1.3 g.) and methyl iodide (9.0 g.) in dry ether. After standing overnight the mixture was decomposed by adding ice and hydrochloric acid, and then extracted with ether. After washing and drying the ethereal extract was evaporated to dryness. The oily product was dehydrated either by heating with phosphorus tribromide, by solution in glacial acetic acid saturated with hydrogen chloride, or by direct distillation. In all cases a colourless oil, boiling point 166–71°/1 m. m. pressure, was obtained. On treatment with methanol (100 c. c.) and ice-cooling, a white crystalline solid separated. This was recrystallised from methanol, and consisted of β-ethyl-α:2-dimethyl-4:4'-dimethoxystilbene (I, $R_1=R_4=R_5=R_6=Me$, $R_2=Et$, $R_3=H$), separating in prisms, melting point 67–8°. It was accompanied by an oily isomer having the same empirical formula, which remained in solution in the mother liquor.

The crystalline isomer was demethylated, either by heating with an excess of methylmagnesium iodide at 170° or by the action of aqueous-alcoholic potassium hydroxide at 220–5°, to β-ethyl-α:2-dimethyl-4:4'-dihydroxystilbene (I, $R_1=R_4=Me$, $R_2=Et$, $R_3=R_5=R_6=H$), crystallising in fine needles from benzene, melting point 153–4°.

The aforementioned oil isomer was hydrogenated by the catalytic method described in Example III. The product, β-ethyl-α:2-dimethyl-4:4'-dimethoxydibenzyl (II, $R_1=R_4=R_5=R_6=Me$, $R_2=Et$, $R_3=H$)

crystallised from methanol in prisms, melting point 72–3°. It was demethylated in the manner described in Example 1, and thus afforded β-ethyl-α-:2-dimethyl-4:4'-dihydroxydibenzyl (II, $R_1=R_4=Me$, $R_2=Et$, $R_3=R_5=R_6=H$) which crystalised from benzene in long needles, melting point 140–1°.

Example 5

To prepare 2-phenyl-4-(2'-methyl-4'-methoxy-benzal)-5-oxazolone.—2-methyl - 4 - methoxy-benzaldehyde (100.7 g.), hippuric acid (120 g.), powdered fused sodium acetate (56 g.) and acetic anhydride (171 g.) were heated together at 100° for 4 hours with occasional shaking. The crystalline condensation product was collected and washed first with methanol (about 600 ml.) and then with boiling water (2 litres). A sample of the resulting oxazolone (136 g.) crystallised from ethyl acetate-ethanol in bright yellow needles, melting point 144°. (Found: C, 73.6; H, 5.0. $C_{18}H_{15}O_3N$ requires C, 73.7; H, 5.1%.)

To prepare methyl 2-methyl-4-methoxyphenylacetate.—The oxazolone (136 g.) was refluxed with 10% sodium hydroxide solution (1000 ml.) for 6 hours. After a further 12 hours the filtered solution was well stirred and treated at 0° with 28% hydrogen peroxide (100 ml.), which was slowly added over ½ hour. 2 hours later, the liquid was acidified with concentrated hydrochloric acid and extracted with ether. The dried ethereal extract, on evaporation, afforded a mixture of benzoic and 2-methyl-4-methoxyphenylacetic acids.

To separate this mixture, it was treated with methanol (800 ml.) and concentrated sulphuric acid (20 ml.) and refluxed for 3 hours. Half the methanol was removed, the residue was poured into water (1 litre) and the ethereal extract washed with dilute sodium carbonate solution and dried. Fractionation of this extract gave methyl benzoate (44 g.), boiling point 77–90°/10 mm., and methyl 2-methyl-4-methoxyphenylacetate (55.3 g.), boiling point 147–149°/10 mm., as an odourless, strongly refracting oil.

To prepare 2-methyl-4-methoxyphenylacetic acid.—The methyl ester (55.3 g.), potassium hydroxide (40 g.) water (80 ml.) and methanol (300 ml.) were refluxed for 3 hours and the residue, after removal of most of the methanol, diluted with water and acidified. The resulting precipitate, crystallised from water (1 litre) containing enough acetic acid to give a homogenous solution at the boiling point, afforded 2-methyl-4-methoxyphenylacetic acid in glistening leaflets (44.9 g.), melting point 104–106°. (Found: C, 66.6; H, 6.7. $C_{10}H_{12}O_3$ requires C, 66.6; H, 6.7%.) The acid (44.9 g.) and thionyl chloride (60 g.), refluxed for 1 hour, on distillation afforded the acid chloride (42.5 g.) as a colourless liquid with a pleasant aromatic smell, boiling point 147–149°/12 mm. On treatment with ammonia, the acid chloridide gave 2-methyl-4-methoxyphenylacetamide, which crystallised from water in stout needles, melting point 162–3°. (Found: N, 8.0. $C_{10}H_{13}O_2N$ requires N, 7.8%.)

To prepare 2:2'-dimethyldesoxyanisoin.—Powdered aluminum chloride (30.5 g.) was added to a mixture of m-methylanisole (37 g.) and dry carbon disulphide (300 ml.) at 0°. The temperature was then reduced to −10° and 2-methyl-4-methoxyphenylacetyl chloride (30 g.) was slowly added with stirring over 15 minutes. After a further 1½ hours stirring, the mixture was refluxed for 1 hour, decomposed with ice and hydrochloric acid and the volatile products removed by steam-distillation. The residual oil and water mixture was well shaken with ether (250 ml.), and after 12 hours the solid that had separated was collected and crystallised twice from methanol to give colourless prisms of 2:2'-dimethyldesoxyanisoin. (12.8 g.), melting point 93–94°. (Found: C, 76.1; H, 7.2. $C_{18}H_{20}O_3$ requires C, 76.0; H, 7.1%.) A further 3.5 g., melting point 91–2°, was obtained from the mother liquors and from the original ether extract.

To prepare *ms:2:2'-trimethyldesoxyanisoin.*— 2:2'-dimethyldesoxyanisoin (12.1 g.) was added to a solution of sodium (3.3 g.) in ethanol (90 ml.) and the whole boiled for 15 minutes to give an orange solution. Methyl iodide (45 g.) was gradually added to the cooled solution and the mixture refluxed for a total of 16 hours. The residue, after removal of methyl iodide and ethanol, was treated with water and extracted with ether, when a quantity of starting material (about 5 g.) separated. After 12 hours the latter was removed and the ethereal layer dried and distilled. The oily distillate, after several days at 0° in 3 volumes of ether, deposited a further 0.9 g. of starting material, which was also removed. Fractionation of the filtrate gave *ms:2:2'-trimethyldesoxybenzoin* (III, $R_1=R_2=R_3=R_5=R_6=Me$) as an oil (5.5 g.), boiling point 202–203°/1 mm.

To prepare *α:β:2:2'-tetramethyl-4:4'-dimethoxystilbene.*—A solution of ms:2:2'-trimethyldesoxybenzoin (4.5 g.) in dry ether was added to the Grignard reagent prepared from magnesium (0.55 g.) and methyl iodide (4.5 g.) in ether. After several hours, the product was decomposed with acid and worked up in the usual way by extraction with ether. The resulting oil recrystallised from hexane (A) in soft plates (2.8 g.), melting point 91–98°, probably consisting of impure 2:3-bis(2'-methyl-4-methoxyphenyl)2 - butanol, which was converted to the stilbene derivative without further purification.

The carbinol (2.8 g.) was dissolved in a saturated solution of hydrochloric acid in glacial acetic acid (12 ml.) allowed to stand 24 hours, and then poured into water. The ethereal extract was well washed with sodium carbonate solution, dried and fractionated to give an oil (2.0 g.), boiling point 172–173°/1–2 mm., which on crystallisation from methanol (B) yielded α:β:2:2'-tetramethyl-4:4'-dimethoxystilbene (I, $R_1=R_2=R_3=R_4=R_5=R_6=Me$)

(0.75 g.), as prisms, melting point 97–98°. (Found: C, 80.9, H, 8.3. $C_{20}H_{24}O_2$ requires C, 81.0, H, 8.1%.) A further crop (0.7 g.) was obtained from the hexane mother liquor (A) of the carbinol (see above). A crude oily isomer of the crystalline stilbene was isolated from both mother liquors (A) and (B) by evaporation.

To prepare *α:β:2:2'-tetramethyl-4:4' - dihydroxystilbene.*—Crystalline α:β:2:2' - tetramethyl-4:4'-dimeth-oxystilbene (0.8 g.) was added to the Grignard reagent prepared from magnesium (0.5 g.) and methyl iodide (1.2 ml.) and the mixture heated at 170° until reaction had ceased (¾ hour). The buff powder was decomposed with ice and dilute hydrochloric acid, and the resulting gum extracted with hot benzene (20 ml.) The extract, dried, cleaned with charcoal, and cooled, yielded α:β:2:2'-tetramethyl-4:4'-dihydroxystilbene (I, $R_1=R_2=R_3=R_4=Me$, $R_5=R_6=H$) which recrystallised from benzene in characteristic needles (0.3 g.) melting point 208–210°, containing solvent of crystallisation. On drying in air they fell to a white amorphous powder, (0.3 g.) melting point 208–210°, with characteristic tendency to become electrified on rubbing. (Found: C, 80.3; H, 7.8. $C_{18}H_{20}O_2$ requires C, 80.6; H, 7.5%.)

*Example 6*

To prepare *α:β:2:2'-tetramethyl-4:4'-dimethoxydibenzyl.*—The oily isomer of α:β:2:2'-tetramethyl-4:4'-dimethoxystilbene prepared as described in Example 5 above (1.5 g.) was dissolved in acetic acid (15 ml.) and hydrogenated at room temperature and 2 atmospheres pressure in the presence of a palladized charcoal or reduced platinum oxide catalyst. The filtrate, diluted with water (8 ml.), gave crystals of the dimethoxydibenzyl derivative (II, $R_1=R_2=R_3=R_4=R_5=R_6=Me$)

which separated from methanol in laths (0.3 g.), melting point 138–139°. (Found: C, 80.5; H, 8.8. $C_{20}H_{26}O_2$ requires C, 80.5, H, 8.8%.)

To prepare *α:β:2:2' - tetramethyl-4:4' - dihydroxydibenzyl.*—α:β:2:2'-tetramethyl - 4:4' - dimethoxydibenzyl (0.23 g.) was boiled for 2 hours with glacial acetic acid (1.5 ml.) and hydriodic acid (density 1.7) (1.0 ml.). The cooled liquid was added to water (20 ml.) and the colour removed by a trace of sodium thiosulphate. The precipitate, on recrystallisation from benzene, afforded the dihydroxybenzyl derivative (II, $R_1=R_2=R_3=R_4=Me$, $R_5=R_6=H$)

in long needles, drying to a white powder (0.14 g.) melting point 189–190°.

What we claim is:

α:β:2:2'-tetramethyl-4:4'-dihydroxystilbene.

ERIC WALTON.
BERTRAM JAMES FRANK HUDSON.

REFERENCES CITED

The following references are of record in the file of this patent:

UNITED STATES PATENTS

| Number | Name | Date |
|---|---|---|
| 2,252,696 | Braker et al. | Aug. 19, 1941 |
| 2,400,033 | Tallman | May 7, 1946 |

OTHER REFERENCES

Buck et al., "Jour. Amer. Chem. Soc.," vol. 51, 1929, pages 2163–67.

Dodds et al., "Proc. Roy Soc.," London, vol. B 127, pages 140–167 (1939).

Solmssen, "Chem. Reviews," vol. 37, No. 3, Dec., 1945, pages 491–598, especially pages 528, 531, 532.